Aug. 24, 1965

J. B. CUMMINS ETAL 3,202,069

SEQUENCE CAMERA

Filed Nov. 14, 1962

INVENTORS
JAMES B. CUMMINS
THEODORE R. KOLTER

BY Harvey A. David

ATTORNEY

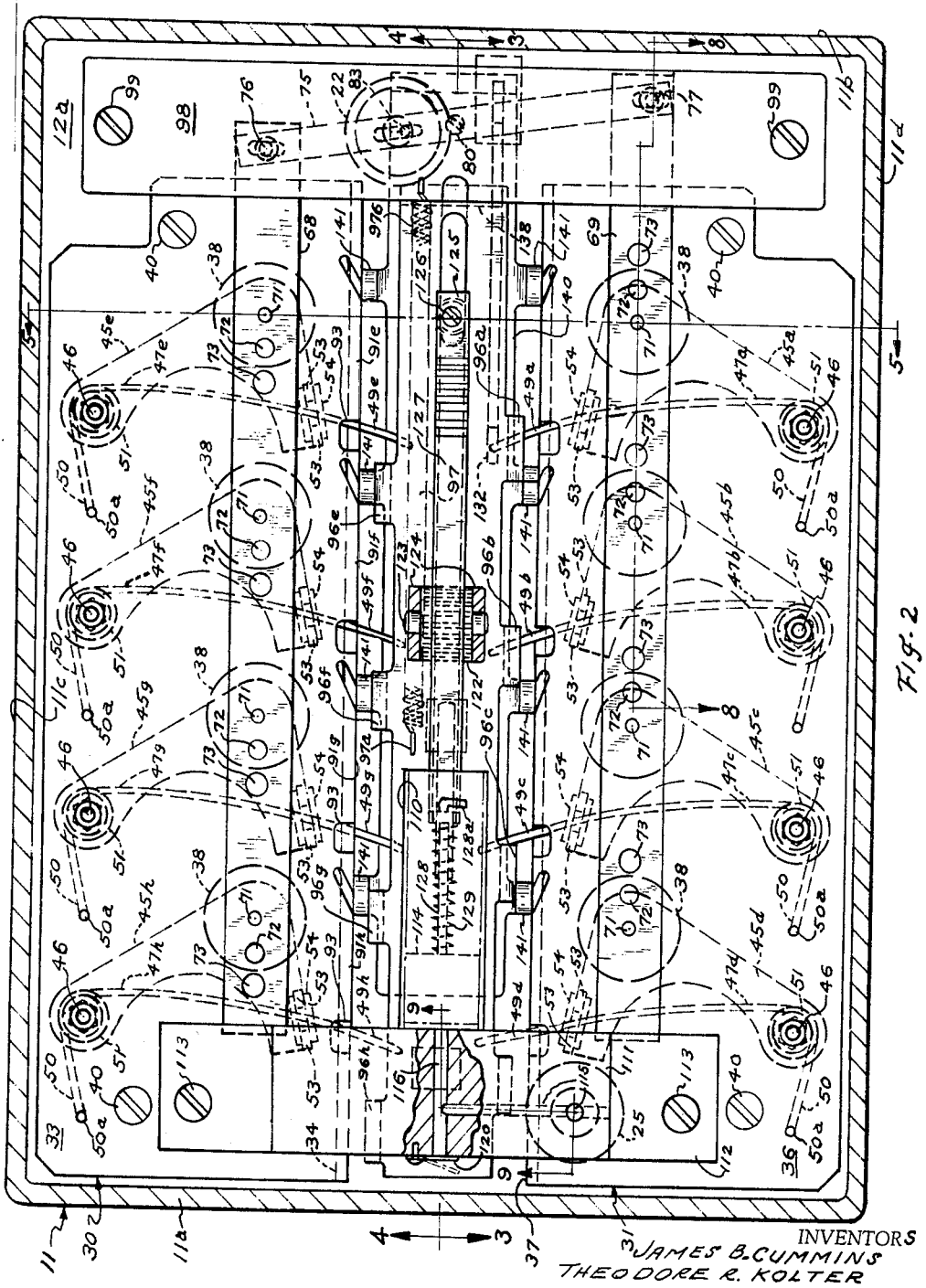

Aug. 24, 1965
J. B. CUMMINS ETAL
3,202,069
SEQUENCE CAMERA
Filed Nov. 14, 1962
5 Sheets-Sheet 3
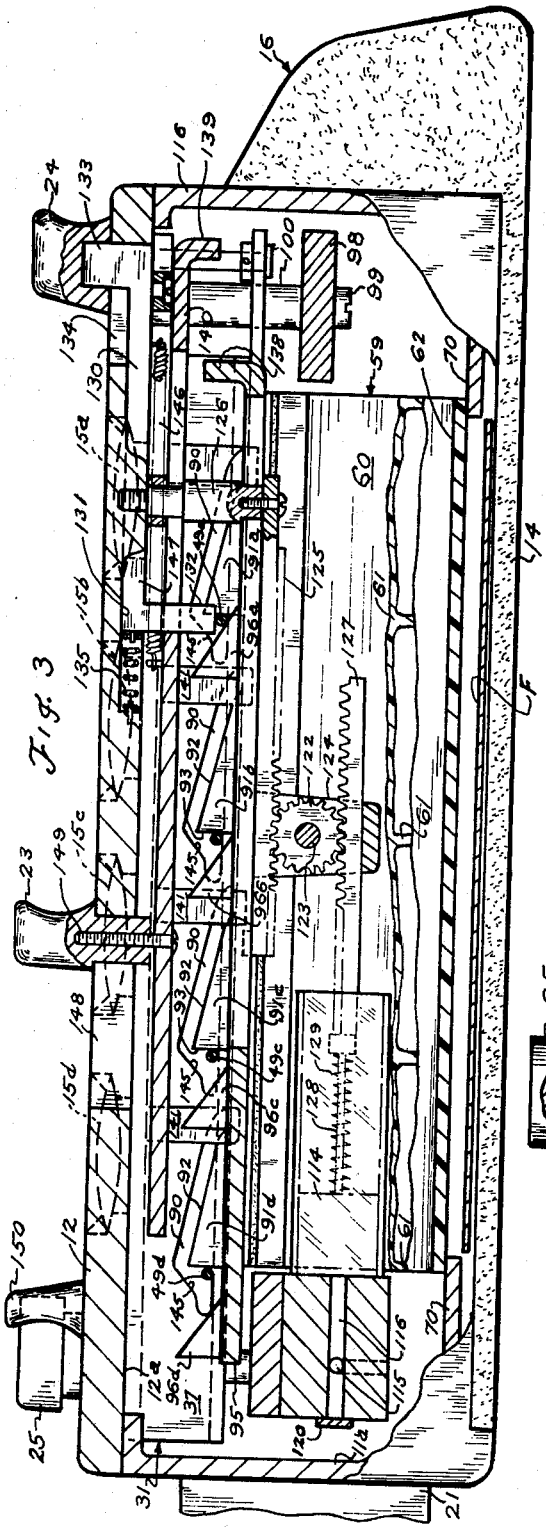
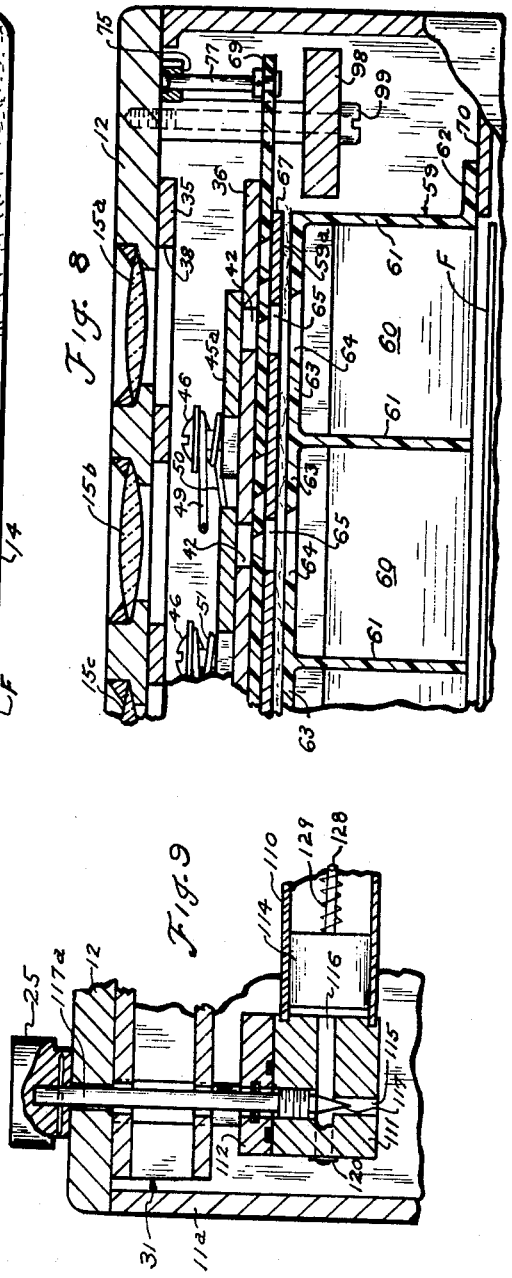
INVENTORS
JAMES B. CUMMINS
THEODORE R. KOLTER
BY Harvey A. David
ATTORNEY

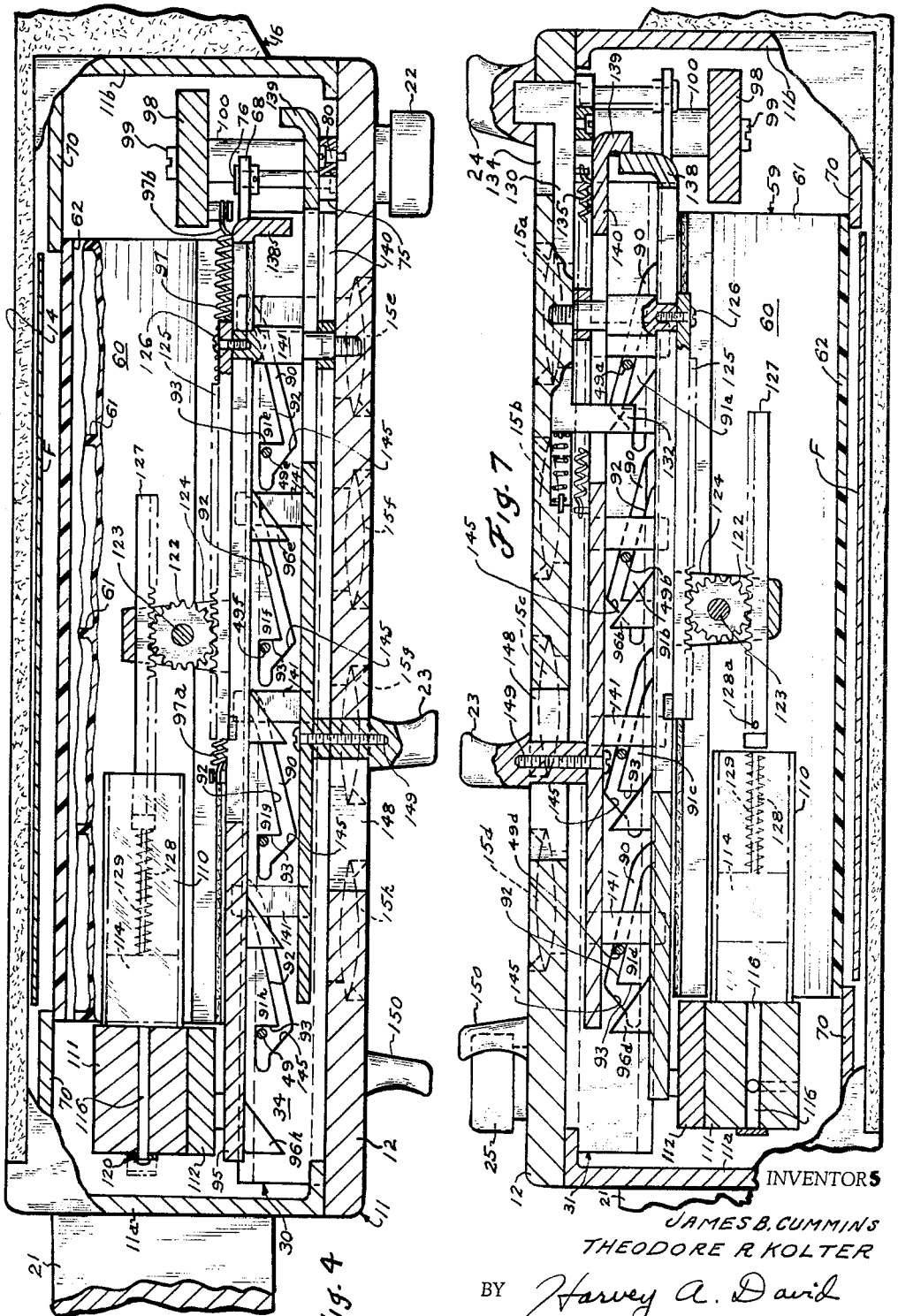

Aug. 24, 1965  J. B. CUMMINS ETAL  3,202,069
SEQUENCE CAMERA
Filed Nov. 14, 1962  5 Sheets-Sheet 5
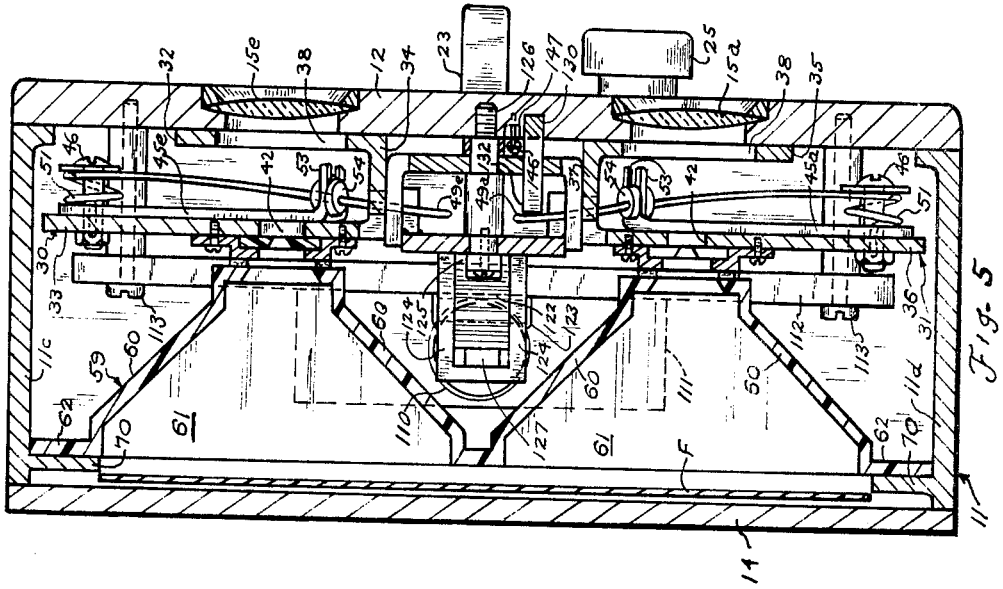
INVENTORS
JAMES B. CUMMINS
THEODORE R. KOLTER
BY Harvey A. David
ATTORNEY

United States Patent Office

3,202,069
Patented Aug. 24, 1965

3,202,069
SEQUENCE CAMERA
James B. Cummins, Silver Spring, Md., and Theodore R. Kolter, St. Petersburg, Fla.; said Cummins assignor to Photogrammetry, Inc., Rockville, Md., a corporation of Delaware
Filed Nov. 14, 1962, Ser. No. 237,571
8 Claims. (Cl. 95—36)

This invention relates to improvements in multiple lens sequence cameras for producing on a single film or plate a plurality of still photographs of a moving object taken at predetermined intervals, with the photographs being the result of sequential exposures of predetermined areas of the film so as to provide in a single format a photographic record of the movements of the object. While cameras of this type have many useful applications, they are particularly useful in the study of a golfer's swing or a diving contestant's body movements, or the like.

Multi-lens sequence cameras have been proposed in the past. However, they have been unwieldy in size, incapable of maintaining accuracy in shutter speeds and time intervals with repeated use, have required skilled operators, and are manifestly unsuited to use with the high speed films available today such as "Polaroid" film having an ASA speed of 3,200 and which can be developed "on the spot" in ten seconds. One form of prior art sequence camera utilizes a curtain having staggered apertures which are drawn past a plurality of lenses at a predetermined speed to provide a sequence of exposures. In that type of camera, both the exposure time and the period between exposures are directly related to the rate of movement of the curtain so that neither may be varied without changing the other. Another type of prior art camera utilizes magnetic solenoid actuated releasing means for independent shutters and energized by a rotating drum switch. That arrangement is unsatisfactory for use with high speed film because of the time delay inherently introduced by the inertia of the solenoid armature and because of lack of reproducible performance. Other objections to the prior art sequence cameras include the necessity of bulky winding mechanisms, electric motor timing means, weighty solenoid and switch mechanisms, electrical connections, and the like.

Accordingly, it is one important object of this invention to provide a particularly versatile, compact, and reliable sequence camera which can be used by operators having no unusual skills.

A further object of this invention is the provision of a multiple lens sequence camera which requires only inexpensive lenses and easily manufactured parts, yet provides shutter speeds on the order of one one-thousandth or one two-thousandth of a second so that fast film such as "Polaroid" film having an ASA rating of 3,200 may be used.

As another important object this invention aims to provide an improved multiple lens sequence camera for producing at timed intervals photographic exposures of predetermined areas of the photographically sensitive surface, and including a novel and inexpensive yet reliable shutter mechanism of the type comprising a plurality of independently operable spring driven shutters and means for tripping or releasing the shutters in a predetermined sequence.

Another object of this invention is the provision of an improved sequence camera of the foregoing character wherein the shutter speeds are independent of the periods between firing, and which comprises means for adjustably governing the releasing means so as to vary the interval of time between exposures.

Yet another object of this invention is the provision of a novel sequential shutter mechanism comprising a plurality of spring operated shutter blades and corresponding blocking members for holding the shutters in their cocked positions, preferably by acting on the shutter springs, and having a release slide including wedge means for sequentially disengaging the shutters or their springs from the blocking members upon predetermined increments of travel of the release slide under the influence of a release spring. In one preferred embodiment, the release slide is adjustably governed in its travel by a pneumatic check means in the form of a piston and cylinder and a bleed valve for controlling the flow of air between the exterior and interior of the cylinder, whereby the time intervals between the releasing of the shutters may be selectively controlled.

Other objects and advantages of sequence cameras embodying this invention will become apparent from the following detailed description of a presently preferred embodiment thereof read in conjunction with the accompanying sheets of drawings forming a part of this specification, and in which:

FIG. 2 is a longitudinal sectional view of the camera of FIG. 1 on an enlarged scale and taken substantially along line 2—2 of FIG. 1;

FIG. 3 is a sectional view taken in the direction of the arrows 3—3 of FIG. 2;

FIG. 4 is a sectional view taken in the direction of the arrows 4—4 of FIG. 2;

FIG. 5 is a sectional view taken substantially along line 5—5 of FIG. 2;

FIG. 6 is a fragmentary sectional view similar to FIG. 2 but with parts broken away to reveal the shutter means, some of which are in different operative positions;

FIG. 7 is a view similar to FIG. 3 but showing the relationship of certain parts during a cocking operation;

FIG. 8 is a fragmentary view taken along line 8—8 of FIG. 2 and illustrating the construction of the light mask; and FIG. 9 is a fragmentary sectional view taken along line 9—9 of FIG. 2.

Figure 1:
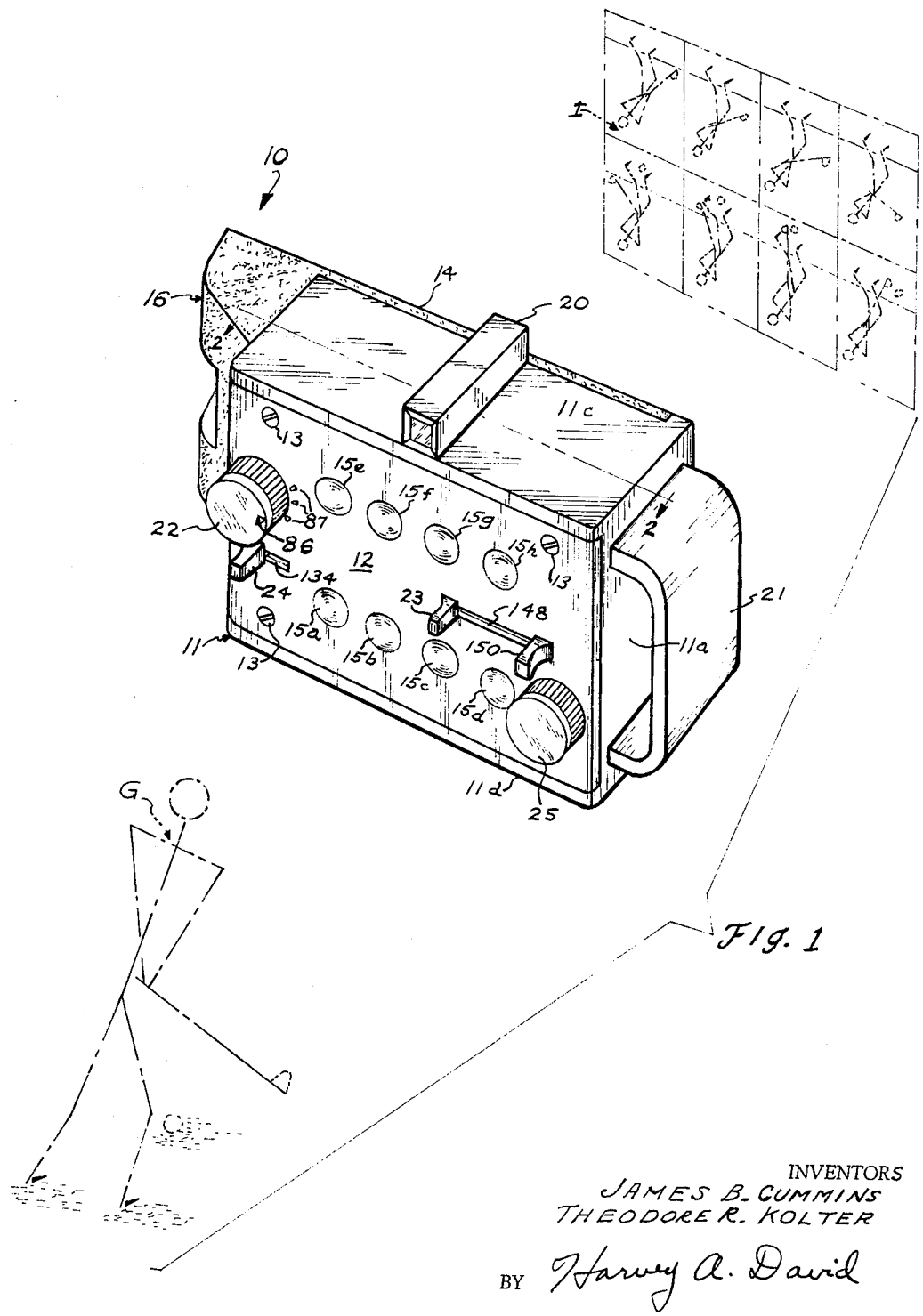
FIG. 1 is a perspective view of a sequence camera embodying the invention, and showing the same aimed at a moving object and illustrating in phantom a sequence of photographic images made by the camera.

Referring to FIG. 1, there is illustrated therein a sequence camera 10 embodying this invention and which comprises a generally rectangular casing 11 having end walls 11a, 11b, a top wall 11c, and a bottom wall 11d which are conveniently formed as a unit. A front wall in the form of a removable plate 12 is suitably secured, as by screws 13, to the casing 11 and extends generally parallel to a back wall 14. In the front plate 12 are mounted a series of eight lenses 15a–15h which are arranged in two horizontal rows of four each and are adapted to focus light rays from a moving object, such as a golfer G, onto predetermined areas of a photographically sensitive film surface supported within the casing and adjacent the back wall 14. The lenses are provided with shutter means, described hereafter, which are fired at timed intervals to "stop" the action of the golfer G and produce a series of negative images, schematically shown at I, which are used to form positive photographic representations or pictures of the various postures assumed by the golfer G during a swing. These pictures may be studied in comparison with a professional golfer to determine corrective measures to improve one's swing. Of course, the reference herein to use of cameras embodying the invention for the study of a golfer's swing is exemplary only, for the invention is adapted to use in producing a sequence of still pictures of any moving object within the exposure limitations of the camera embodying the invention.

In the present example the camera is adapted to use a fast film, such as "Polaroid" film having an ASA speed rating on the order of 3,200, and which is of the type developed within the camera. Accordingly, a film processing means, indicated generally at 16, is connected integrally with the back wall 14 and extends beyond the end wall 11b of the camera. The film processing means 16 forms no part of the present invention and so will not be described further here. Suffice it to say that cameras embodying this invention may be used with fast film in other forms such as plates, roll film, and the like, whether of the "on the spot developing" type or not.

The camera is further provided with a conventional view finder 20 for aiming the camera, a handle 21 on the end wall 11a opposite the processing means 16, and a plurality of controls including an aperture selecting knob 22, a cocking knob 23, a trigger 24, and a sequence interval selecting knob 25. All of these controls will be described more fully as the description proceeds.

Referring now to FIGS. 2 and 5, there is mounted on the inner surface 12a of the plate 12 a pair of upper and lower shutter assemblies including channel shaped members 30 and 31 which are preferably formed from sheet metal. The channel member 30 comprises a narrow flange 32 integrally joined in spaced parallel relation with a wide flange 33 by a side wall 34. Similarly, the channel member 31 comprises a narrow flange 35 integrally joined in spaced parallel relation with a wide flange 36 by a side wall 37.

The narrow flanges 32 and 35 lie against the front wall 12 and are provided with openings 38 in alignment with the lenses 15a–15h. The channel members 30 and 31 are secured to the front wall 12 by suitable screws 40. The flanges 33 and 36 are also provided with openings 42 which are in alignment with the lenses 15a–15h and with the openings 38, but are adapted to be covered by blade type shutters 45a–45h which are disposed within the channel members and are pivotally secured to the wide flanges 33 and 36 as by pivot screw means 46.

The shutters 45a–45d are normally biased in a counter-clockwise direction as viewed in FIGS. 2 and 6 by wire shutter springs 47a–47d, while shutters 45e–45h are normally biased in a clockwise direction by wire shutter springs 47e–47h. The springs 47 are preferably formed of spring steel wire commonly known as piano wire having a diameter of approximately 1/32 inch and are each provided with a long leg 49 and a short leg 50 extending from a coiled portion 51 disposed about the respective shutter pivot screw means 46.

As is best seen in FIGS. 5 and 6 each of the shutters 45a–45h comprises a blade of relatively thin, lightweight metal such as aluminum, and includes a pair of upturned tabs 53 between which is secured a block 54 of a plastic material such as "Nylon" having an aperture through which the corresponding spring leg 49 extends. The nylon blocks 54 absorb shock and prevent wear from occurring between the wire legs 49 and the shutter tabs 53, thereby aiding in maintaining precise and constant shutter speeds. The short legs 50 are moored to their respective flanges 33 and 36 by engagement of down-turned ends 50a of the spring legs extending into openings in the flanges. Each of the shutters further comprises an opening 55 which cooperates with the respective opening 42 to provide a momentary exposure of a predetermined area of a sensitized surface of a film F when the shutter is driven by its spring from a cocked to a released position.

In the present example, the strength of the springs 47a–47h, the masses of the shutters 45a–45h, and the size of the openings 55 with respect to the openings 42, are such that exposures on the order of one one-thousandth to one two-thousandth of a second are easily obtained. Such speeds are effective to "stop" a golf ball as it leaves the head of the club at a velocity of about 200 miles per hour and at a distance of only a few feet from the camera.

The high shutter speeds are achieved principally by the use of small openings 42 and 55, and correspondingly small apertures or "f stops" with respect to the relatively large diameters of the lenses 15a–15h. Accordingly, only a small portion of each lens is used for any part of the image produced, and hence inexpensive molded plastic lenses may be employed without sacrificing good resolution.

The film F is supported by suitable means associated with the back wall 14 at a predetermined distance from the lenses 15a–15h, which distance depends of course upon the focal length of the lenses, and the predetermined areas of exposure are determined by a compartmented light shroud or mask 59. The mask 59 is preferably formed of a molded plastic material having suitable non-reflective surface qualities and comprises a series of compartments arranged in two banks of four and each being defined by sloping side walls 60 and vertical end walls 61 (FIGS. 5 and 8) which are supported by a flange or web 62 and terminate at a transverse wall 63. The transverse walls 63 are provided with openings 64 which are in alignment with openings 42 and with openings 65 in retainer plates 66 and 67 for two parallel, aperture selecting bars 68 and 69 which are disposed between the walls 63 and the respective flanges 33 and 36 of channel members 30 and 31. The flange or web 62 rests against an inwardly directed flange 70 of the casing 11 as best shown in FIGS. 2 and 8. Although the mask 59 does not extend into the film holding back 14 and is not engaged by the film, it produces sharply defined "frames." A light sealing application of felt or similar material 59a is applied between the edges of the wall means 63 and the aperture bar retaining plates 66 and 67.

The aperture selecting bars 68, 69 are held by the retainer plates 66, 67, in sliding relation with the flanges 33, 36, respectively, and are provided with eight sets of three apertures 71, 72, 73, which are graduated in size. The bars 68, 69 are adapted to be moved simultaneously so as to selectively bring one of the apertures 71, 72, 73 of each set into alignment with the corresponding lens and associated openings 42, 64, 65 whereby the exposure may be varied to suit existing light conditions.

The simultaneous movement of the bars 68, 69 is effected by a lever 75 the ends of which are pivotally connected to the bars as at 76 and 77. The lever 75 is pivoted centrally thereof, as at 80, to the front plate 12 and it will be recognized that movement of the lever about pivot 80 will produce linear movement of the bars 68, 69 in opposite directions for bringing a selected aperture 71, 72, or 73 into operative alignment with each lens.

The lever 75 is activated by rotation of the previously mentioned aperture selecting control knob 22 which is secured to a shaft 82, journaled in plate 12 and having an eccentric pin 83 at its inner end in operative engagement with a slot 84 in the lever. The knob 22 is conveniently provided with a suitable index mark 86 which cooperates with indicia 87 on the plate 12 to indicate the aperture opening in use.

Referring now to FIGS. 2, 3 and 4, it will be seen that the side wall portions 34 and 37 of the channel members 30 and 31 are provided with a series of shaped, elongated openings or slots 90 through which the long leg portions 49a–49h of the shutter springs 47a–47h extend into a space defined between the walls 34 and 37 of the upper and lower shutter assemblies. The openings 90 are so shaped as to form a series of tooth-like blocking members 91a–91h having sloping sides 92 and straight sides 93. When the camera is in a cocked condition as illustrated in FIGS. 2, 3 and 4, the legs 49a–49h of the shutter springs 47a–47h are lodged against the straight sides 93 of the blocking members 91 as shown. The springs are thereby blocked against movement and the associated shutters 48 are held in their cocked positions overlying the openings 42 and preventing light from reaching the film F.

Means are provided for sequentially moving the spring legs 49a–49h along the surfaces 93 of the blocking members until they are free to follow the portions of the openings 90 defined by the sloping edges 92 of the members 91. This is effected by means of a shutter releasing slide 95 which is mounted for reciprocatory movement between the channel members 30 and 31, and is normally biased toward the right as viewed in FIGS. 2 and 3 by means of a tension spring 97 having one end 97a connected to the slide 95 and the other end 97b connected to a suitable cross member 98. The cross member 98 spans the right hand ends of the channel members 30 and 31 and is secured by suitable screw means 99 extending through spacers 100. The release slide 95 comprises a series of four wedge members 96a–96d along the side thereof adjacent wall 37 of channel member 31, and four wedge members 96e–96h along the side thereof adjacent wall 34 of channel member 30. The wedge members 96a–96h have sloping edges disposed toward the corresponding spring ends 49a–49h and are adapted, upon movement of the slide 95 under the influence of spring 97, to engage the spring ends and drive them from their lodged positions against the surfaces 93 of the blocking members 91, thereby permitting the springs 47a–47h to swing the shutters 45a–45h from their cocked positions, through their film exposing positions, to their released positions. These positions are best illustrated in FIG. 6 wherein shutter 45f is shown in its cocked position, shutter 45e is passing through its film exposing position, and shutters 45a and 45b are shown in their released or rest positions.

In order to fire or release the shutters 45a–45h in sequence and at timed intervals, the wedge members are arranged so that the spacing therebetween is greater than the spacing between the surfaces 93 of the blocking members 91a–91h and governor means is provided for controlling the time rate of movement of the release slide 95 under the influence of spring 97.

The governor means, best illustrated in FIGS. 2, 3, and 9 comprises an adjustable pneumatic check means including a stationary glass cylinder 110, extending from a block 111 supported on a cross bar 112 which is secured by screws 113 to the front plate 12, and a carbon piston 114 which is caused to move in the cylinder in accordance with movement of the release slide 95. The block 111 is provided with an air inlet passage 115 which communicates with a passage 116 opening into the cylinder 110 and is controlled by a needle valve 117. The needle valve 117 is threaded in block 111 as shown and has a shaft portion 117a on which is secured the time interval selecting knob 25. A resilient flapper valve 120, of rubber or the like, is secured to the block 111 over the end of passage 116 and serves as a check valve which permits air to be expelled from the cylinder 110 by the piston 114 during the cocking operation of the apparatus, which operation will be described more fully as the specification proceeds.

The connection between the release slide 95 and the piston 114 is effected by rack and pinion means which provides for movement of the piston through twice the range of movement of the slide 95 by spring 97. Thus, a pinion 122 is carried by a pin 123 between arms 124 which are fixed to the release slide 95. The pinion 122 is in meshing engagement with a fixed rack 125, secured by screw and post means 126 to the front plate 12, and a movable rack 127 which is connected by a lost motion connecting rod 128 to the piston 114. The connecting rod 128 extends through an opening in the end of the rack 127, and has a hooked end 128a to limit movement of the rod 128 away from the rack 127. A compression spring 129 is disposed about rod 128 and acts between the piston 114 and the rack 127 to normally maintain the rod 128 in extended relation to the rack. This arrangement permits overtravel of the rack 127 with respect to the piston 114 during the cocking operation.

It will be recognized that the rate of movement of the release slide 95 under the influence of the spring 97 will be limited by the rate at which needle valve 117 permits air to bleed into the cylinder 110, and that this may be varied by rotation of the interval control knob 25. The exaggerated spacing arrangement of the shutter spring releasing wedge members 96a–96h causes a shutter to be fired upon successive increments of travel of the release slide 95, the increments being on the order of 3/32 of an inch between the releasing of each shutter.

By regulating the air flow into cylinder 110, the interval between exposures may be effectively controlled, and it will be noted that the shutter speed or exposure time of each frame or sequence is independent of the time interval between exposures. In the present example, the knob 25 may be set to provide intervals between exposures of 1/16 to 1/4 second.

Means are provided for holding the apparatus in the cocked condition of FIG. 3 until it is desired that the apparatus be fired to produce a sequence of photographs. To this end, there is provided a sear member 130 which is slidably recessed in a groove 131 in the front plate 12. The sear member 130 has an inturned end 132 which normally overlies the leg 49 of the spring 47a associated with shutter 45a and prevents it from being forced by the wedge member 96a of release slide 95 into the portion of slot 93 for moving the shutter 45a. The sear member 130 has an outward projection 133 extending through a slot 134 in plate 12 and the previously mentioned trigger 24 is secured thereto. A compression spring 135 is disposed in groove 131 and normally biases the sear member 130 to the right as viewed in FIG. 3. Movement of the trigger 24 to the left as viewed in FIG. 3, against spring 135, will cause the sear member 130 to release the spring end 49 of shutter spring 47a for tripping from its blocked position by the release slide 95. It will be recognized that release of spring end 49 of shutter spring 47a will permit continued movement of release slide 95 until each of the remaining shutters 45b–45h have been fired in sequence. Upon release of the trigger 24, spring 135 will cause it to return to its normal position.

The extent of travel of release slide 95 under the influence of spring 97 is limited by engagement of an upturned end 138 thereof with a downturned end 139 of a cocking slide 140 which is located between channel members 30 and 31 in nested relation with the release slide 95. The cocking slide 140 comprises a plurality of shutter spring pushing elements 141 which are adapted as illustrated in FIG. 7 to engage the protruding legs 49 of the shutter springs 47a–47h, and carry them to the left along the inclined surfaces 93 of blocking members 91 until they engage cam surfaces 145 which tend to move the spring ends toward the wide flanges 33 and 36 so that upon release of the cocking slide the spring ends 49 will engage the corresponding surfaces 93 of the blocking members.

The cocking slide 140 is normally biased toward the right by a spring 146 which is recessed in a groove 147 in plate 12, and is adapted to be moved against the influence of spring 146 by the previously mentioned cocking handle 23 which extends into a slot 148 in the plate 12 and is secured to the cocking slide as by a screw 149. In order to assist in the movement of the cocking handle 23 there is provided a stationary handle 150 which serves as a finger grip, and is conveniently held by the index finger while the thumb actuates the lever 23. It is during this movement also, that the piston 114 is moved within the cylinder 110 toward the block 111, expelling the air therefrom through the flapper valve 120.

As the cocking slide is moved by handle 23, the downturned end 139 of the cocking slide acts against end 138 of the release slide to move the latter against the force of spring 97 to the position illustrated in FIGS. 2 and 3. In its movement along slot or opening 90 during the cocking operation, the end 49a of spring 47a pushes the inturned end 132 of the sear member 130 aside momentarily to gain passage, after which the sear end 132 returns to its normal position and holds the spring end in blocked engagement with the blocking member 91a.

The camera 10 is then cocked and ready to have a new film surface positioned between the mask means 60 and the back wall 14 and then, when the aperture and interval setting knobs 22 and 25 are appropriately positioned, the trigger 24 may be actuated to produce a sequence of exposures. A convenient check may be made to determine if all of the shutters are in a cocked condition by looking through the lenses 15a–15h whereby the leg 49 of the shutter spring of each of the cocked shutters will not be seen lying across its lens opening.

From the foregoing detailed description, it will be appreciated that there has been provided by this invention an improved sequence camera apparatus which achieves the aforementioned objects and advantages, and others. It will also be appreciated that the foregoing description is of a presently preferred embodiment and that certain changes, modifications, and additions can be incorporated without departing from the scope of the invention. For example, cameras embodying the invention may include lens focusing means rather than fixed focus lenses, automatic aperture or exposure control, mounting means for use with tripods or other stands, the provision of more or fewer than eight lenses, and the like.

Accordingly, while the invention has been described in considerable detail with reference to a specific sequence camera embodying the invention, it will be understood that the invention is not limited thereto, but rather the invention includes all those changes, modifications, additions, adaptations and uses as are reasonably embraced by the scope of the claims hereof.

Having described our invention, we claim:

1. A multiple lens sequence camera comprising:
   (a) a plurality of shutter blades independently movable with respect to apertures for making exposures of photographic film,
   (b) springs biasing said shutter blades from first positions toward second positions,
   (c) a plurality of spaced blocking members each engageable by one of said springs so as to hold said shutters in said first positions,
   (d) a release slide reciprocable with respect to said blocking members and comprising a plurality of wedge members spaced apart a distance greater than the spacing of said blocking members,
   (e) said wedge members being operative upon movement of said release slide in one direction to sequentially disengage said springs from said blocking members,
   (f) drive means for effecting movement of said release slide in said one direction, and
   (g) sear means resiliently biased into a position for holding a first one of said springs against disengagement from its respective blocking member by the respective wedge of said release slide, whereby said release slide is prevented from disengaging the others of said springs, said sear means being movable out of said holding position to release said first spring and permit subsequent sequential release of the others of said springs.

2. A sequence camera as defined in claim 1 and wherein said drive means comprises spring means acting in said one direction on said release slide, and pneumatic governor means acting to check said movement of said slide in said one direction.

3. A sequence camera as defined in claim 1 and comprising a cocking slide reciprocable with respect to said blocking members and including a plurality of pusher members, said pusher members being operative to move said springs into engagement with said blocking members upon movement of said cocking slide in a direction opposite to said one direction, and said cocking slide being operative to simultaneously move said release slide in said opposite direction.

4. In a sequence camera having a plurality of lenses, a shutter mechanism for effecting exposures through said lenses at predetermined time intervals, said mechanism comprising:
   (a) support means having a wall,
   (b) a series of shutters pivoted to said support means,
   (c) said wall having a plurality of openings defining a plurality of blocking members spaced therealong, each having an inclined surface and a blocking surface,
   (d) a plurality of shutter springs each connected to and normally biasing one of said shutters from a first position toward a second position,
   (e) said springs each having an end portion extending through a corresponding one of said openings,
   (f) said openings further defining cam surfaces inclined oppositely to the inclined surfaces of said blocking members,
   (g) a reciprocable cocking slide having a plurality of pusher members operative upon movement of said slide in one direction to drive said spring end portions along said inclined surfaces and along said cam surfaces whereby said spring ends are brought into engagement with said blocking surfaces upon subsequent movement of said slide in the opposite direction,
   (h) a release slide reciprocable with respect to said blocking members and comprising a corresponding plurality of wedge members having sloping surfaces facing said spring end portions, said wedge members being spaced along said release slide at distances from one another which are greater than the distances between said blocking members, and
   (i) drive means for moving said release slide in said opposite direction at a predetermined rate, whereby said wedge members are operative to sequentially disengage said spring end portions from said blocking surfaces for actuation of said shutters to said second positions at predetermined intervals.

5. In a sequence camera having a plurality of lenses arranged in two parallel rows, a shutter mechanism for effecting exposures through said lenses in sequence at predetermined time intervals, said mechanism comprising:
   (a) support means having first and second parallel walls defining a space therebetween,
   (b) a first series of shutters pivoted to said support means on the outboard side of said first wall, and a second series of shutters pivoted to said support means on the outboard side of said second wall,
   (c) said walls having a plurality of openings defining first and second series of blocking members spaced therealong, each having an inclined surface and a blocking surface,
   (d) a plurality of shutter springs each connected to and normally biasing a corresponding one of said shutters from a first position toward a second position,
   (e) said springs each having an end portion extending through a corresponding one of said openings into said space between said walls,
   (f) said openings further defining cam surfaces inclined oppositely to the inclined surfaces of the blocking members,
   (g) a cocking slide reciprocably disposed between said walls and having pusher members operative upon movement of said slide in one direction to drive said spring end portions along said inclined surfaces and along said cam surfaces whereby said spring ends are brought into engagement with said blocking surfaces upon subsequent movement of said cocking slide in the opposite direction,
   (h) a release slide reciprocably disposed between said walls and comprising first and second series of wedge members having sloping surfaces facing said spring end portions, said wedge members being spaced along said release slide at distances from one another which are greater than the distances between said blocking members, and (i) drive means for moving said release slide in said opposite direction at a predetermined rate, whereby said wedge members are operative to sequentially disengage said spring end portions from said blocking surfaces for actuation of said shutters to said second positions at predetermined intervals.

6. A sequence camera for producing exposures of predetermined areas of a photographic film, said camera comprising:

(a) a casing including means for supporting said photographic film, (b) a plurality of spaced lenses mounted in said casing so as to focus light rays from an object onto said film to form an image of said object in each of said predetermined areas, (c) a shutter means for each of said lenses, (d) each of said shutter means including means defining a stationary aperture, a shutter blade pivoted with respect to the last mentioned means and adapted to move from an aperture closing position through an aperture opening position and biasing means urging said shutter blade from said aperture closing position toward said aperture opening position, (e) a plurality of spaced blocking members each cooperable with one of said shutter means to retain said shutter blades in said aperture closing positions, and (f) releasing means comprising a plurality of spaced wedge members, said wedge members being supported for simultaneous movement with respect to said blocking members, and the spacing between said wedge members being greater than the spacing between said blocking members so that upon said relative movement said wedge members are operative to sequentially release said shutter blades for movement through said aperture opening positions.

7. A sequence camera as defined in claim 6, and comprising sear means supported for movement between a position preventing release of at least one of said shutter blades and a position permitting release thereof.

8. A sequence camera as defined in claim 6 and comprising a cocking member supported for movement with respect to said casing and operable to simultaneously shift all of said shutter blades to said aperture closing positions against the influence of said biasing means.

References Cited by the Examiner

UNITED STATES PATENTS

| | | | |
|---|---|---|---|
| 279,878 | 6/83 | Muybridge | 95—1 |
| 1,454,899 | 5/23 | Legg | 88—16 |
| 1,501,842 | 7/24 | Duda | 88—16 |
| 2,223,849 | 12/40 | Fogler | 88—16 |

NORTON ANSHER, *Primary Examiner.*

JOHN M. HORAN, *Examiner.*